United States Patent
Urmanov et al.

(10) Patent No.: US 7,200,501 B2
(45) Date of Patent: Apr. 3, 2007

(54) REDUCING UNCERTAINTY IN SEVERELY QUANTIZED TELEMETRY SIGNALS

(75) Inventors: Aleksey M. Urmanov, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/194,954

(22) Filed: Aug. 1, 2005

(65) Prior Publication Data

US 2007/0027646 A1   Feb. 1, 2007

(51) Int. Cl.
*H03M 1/06* (2006.01)

(52) U.S. Cl. .......................... 702/64; 702/189; 702/57; 341/200

(58) Field of Classification Search .................. 702/64, 702/57, 66, 69, 70, 74, 75, 78, 79, 106, 107, 702/124–126, 189, 136
See application file for complete search history.

(56) References Cited

U.S. PATENT DOCUMENTS

| | | | |
|---|---|---|---|
| 4,831,382 A | 5/1989 | Debus, Jr. et al. | 341/200 |
| 4,937,763 A | 6/1990 | Mott | 702/183 |
| 5,241,383 A * | 8/1993 | Chen et al. | 375/240.04 |
| 5,448,239 A * | 9/1995 | Blumberg et al. | 341/166 |
| 5,493,297 A * | 2/1996 | Nguyen et al. | 341/118 |
| 5,587,711 A * | 12/1996 | Williams et al. | 341/144 |

FOREIGN PATENT DOCUMENTS

EP   0 729 234 A1   8/1996

* cited by examiner

*Primary Examiner*—Hal Wachsman
(74) *Attorney, Agent, or Firm*—Park, Vaughan & Fleming LLP; Gilbert C. Wong

(57) ABSTRACT

A system that facilitates reducing uncertainty in a quantized signal. During operation, the system measures a quantized output signal from a sensor. Next, the system obtains an initial value for an uncertainty interval for the quantized output signal. The system then margins the quantized output signal high by introducing a controlled increase in the mean of the quantized output signal to produce a high-margined quantized output signal. Next, the system measures the high-margined quantized output signal from the sensor. The system then uses information obtained from the high-margined quantized output signal to reduce the uncertainty interval for the quantized output signal.

20 Claims, 4 Drawing Sheets

REDUCING UNCERTAINTY IN SEVERELY QUANTIZED TELEMETRY SIGNALS

BACKGROUND

1. Field of the Invention

The present invention relates to techniques for reducing uncertainty in a quantized signal. More specifically, the present invention relates to a method and apparatus for reducing uncertainty in a quantized signal by margining the quantized signal.

2. Related Art

Modern computer components such as CPU boards and I/O boards incorporate onboard monitoring mechanisms to protect the electrical components from over-voltage, over-current, and over-temperature events, and to also prevent such events from damaging the rest of the computer system. These monitoring mechanisms typically generate analog electrical signals, which must be converted into corresponding digital signals using analog-to-digital (A/D) converters prior to analyzing the signals. A/D converters often have coarse resolution, and therefore, some signals may be represented by only one or two different values during normal operation. Unfortunately, this low resolution does not make it possible to provide accurate surveillance of the statistical characteristics of the signals for high sensitivity anomaly detection and system failure prevention.

During the system design phase, if a decision is made to use a low-resolution A/D converter, the resulting digitized signal can be severely quantized. For example, commonly used 8-bit A/D converters are only able to encode 256 discrete analog values across the range of the signal. Moreover, all signal values within a given interval (which is referred to as a "quantization interval") are represented as a single digital value.

FIG. 1 illustrates an exemplary signal which is severely quantized. More specifically, FIG. 1 illustrates signal 102, quantized signal 104, and uncertainty intervals 106, 108, 110, and 112. (In FIG. 1, signal 102 is offset from quantized signal 104 to show the two separate signals more clearly.) Note that the spread or variation of signal 102 is much less than the uncertainty intervals, and furthermore, the A/D converter reports quantized signal 104 as a flat line within each uncertainty interval. Therefore, it is statistically impossible to reconstruct the mean and the variance of the original signal from this quantized signal because the true value of the signal can be anywhere within the quantization intervals.

Severe quantization may not be a problem for certain diagnostic applications. However, it is desirable to detect developing anomalies, such as a slow drift in the mean or the variance in a signal, as early as possible. Note that a small drift in either the mean or the variance of a signal can indicate the onset of hardware degradation. Moreover, early detection of these anomalies can help identify the onset of hardware degradation and prevent system failure.

Hence, what is needed is a method and an apparatus for reducing the uncertainty in a severely quantized signal to improve diagnostic sensitivity without the problems described above.

SUMMARY

One embodiment of the present invention provides a system that facilitates reducing uncertainty in a quantized signal. During operation, the system measures a quantized output signal from a sensor. Next, the system obtains an initial value for an uncertainty interval for the quantized output signal. The system then margins the quantized output signal high by introducing a controlled increase in the mean of the quantized output signal to produce a high-margined quantized output signal. Next, the system measures the high-margined quantized output signal from the sensor. The system then uses information obtained from the high-margined quantized output signal to reduce the uncertainty interval for the quantized output signal.

In a variation on this embodiment, the system also margins the quantized output signal low by introducing a controlled decrease in the mean of the quantized output signal to produce a low-margined quantized output signal. Next, the system measures the low-margined quantized output signal from the sensor. The system then uses information obtained from the low-margined quantized output signal to further reduce the uncertainty interval for the quantized output signal.

In a variation on this embodiment, while reducing the uncertainty interval for the quantized output signal, the system obtains the uncertainty intervals for the high-margined and the low-margined quantized output signals. Next, the system determines an upper bound of the uncertainty interval by selecting the minimum upper bound from: the uncertainty interval for the quantized output signal, the uncertainty interval for the high-margined quantized output signal, and the uncertainty interval for the low-margined quantized output signal. The system then determines a lower bound of the uncertainty interval by selecting the maximum lower bound from: the uncertainty interval for the quantized output signal, the uncertainty interval for the high-margined quantized output signal, and the uncertainty interval for the low-margined quantized output signal.

In a variation on this embodiment, margining the quantized output signal high involves increasing an input signal by a fixed amount.

In a variation on this embodiment, margining the quantized output signal low involves decreasing the input signal by a fixed amount.

In a variation on this embodiment, the input signal can include voltage, current, temperature, clock speed, and/or load, and the quantized output signal can include voltage, temperature, and/or current.

In a variation on this embodiment, the initial uncertainty interval is the quantization interval of the quantized output signal.

DETAILED DESCRIPTION

Figure 1:
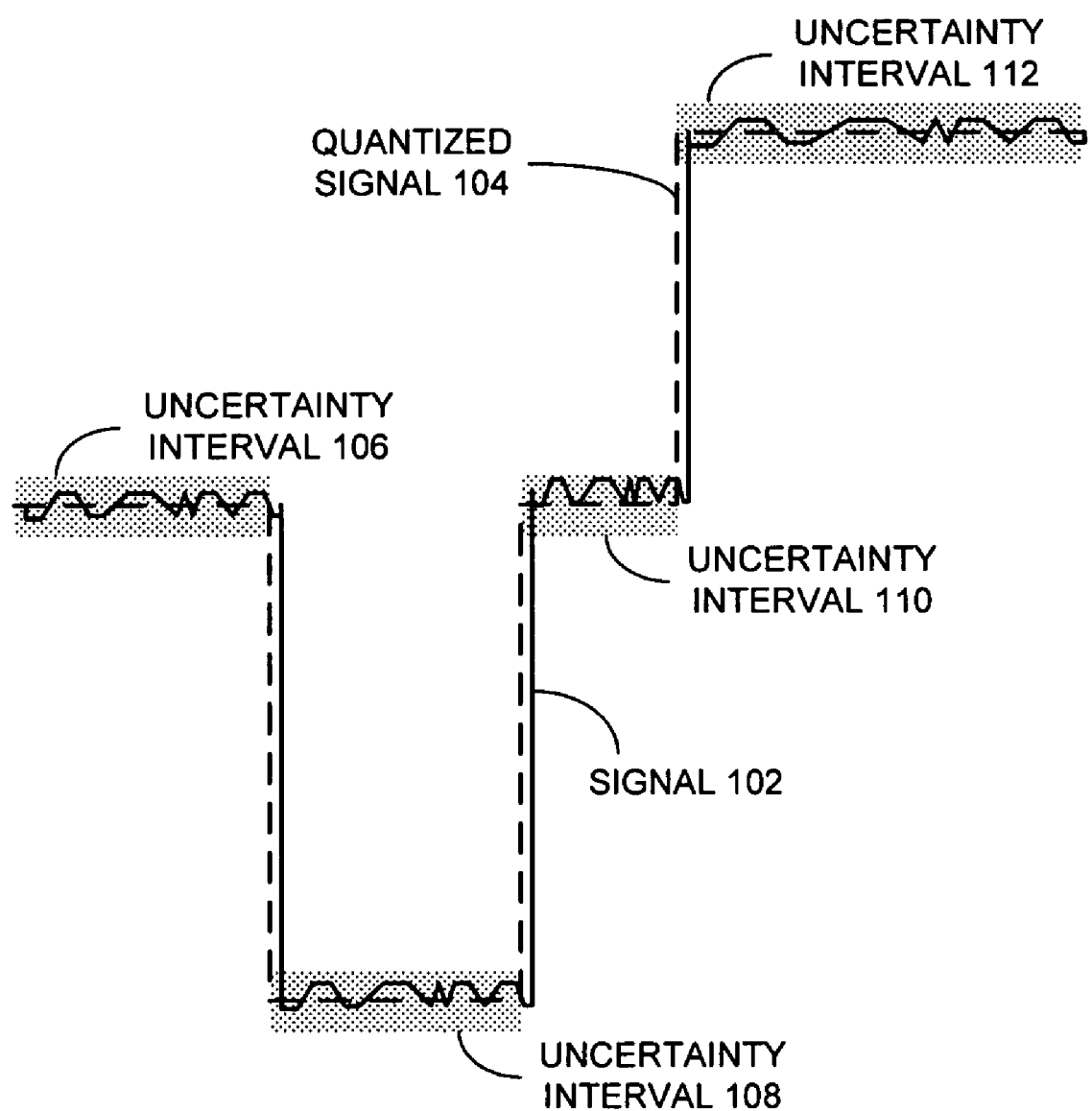
FIG. 1 illustrates an exemplary signal which is severely quantized.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Margining

The present invention presents a technique that facilitates high accuracy inference of the mean and the variance of computer system telemetry signals even if the raw telemetry data is severely quantized by low-resolution A/D converters.

"Margining" is the introduction of a controlled change in the mean of a signal. For example, the outputs of a DC-to-DC converter in an exemplary power supply can be margined by +/−3%. Margining is typically used to screen defective (or weak) components during testing of ready-to-ship systems, and in Ongoing Reliability Testing (ORT) of systems after they are shipped.

In one embodiment of the present invention, margining is used to reduce uncertainty of severely quantized signals as follows: Over a period of time $T_{NO}$, the nominal signal $x_{NO}$ is measured and quantized. For severely quantized signals, $x_{NO}$ is a flat line at level $Q[x_{NO}]$, where Q represents the quantization operation. The uncertainty interval for the actual signal is $Q[x_{NO}]+/-\Delta$, where $\Delta$ is half of the quantization interval. When the A/D converter reports value $Q[x_{NO}]$, the actual signal $x_{NO}$ could be anywhere within the uncertainty interval:

$$Q[x_{NO}]-\Delta < x_{NO} < Q[x_{NO}]+\Delta, \text{ for } T_{NO}$$

Note that the uncertainty interval is $2\Delta$ wide. Also note that the quantized signal is in the middle of the uncertainty interval.

The signal is high-margined ($x_{HI}$) and low-margined ($x_{LO}$) for period of time $T_{HI}$ and $T_{LO}$, respectively. For the margined signals, the following inequalities hold:

$$Q[x_{HI}]-\Delta < x_{HI} < Q[x_{HI}]+\Delta, \text{ for } T_{HI}$$

$$Q[x_{LO}]-\Delta < x_{LO} < Q[x_{LO}]+\Delta, \text{ for } T_{LO}$$

Figure 2:
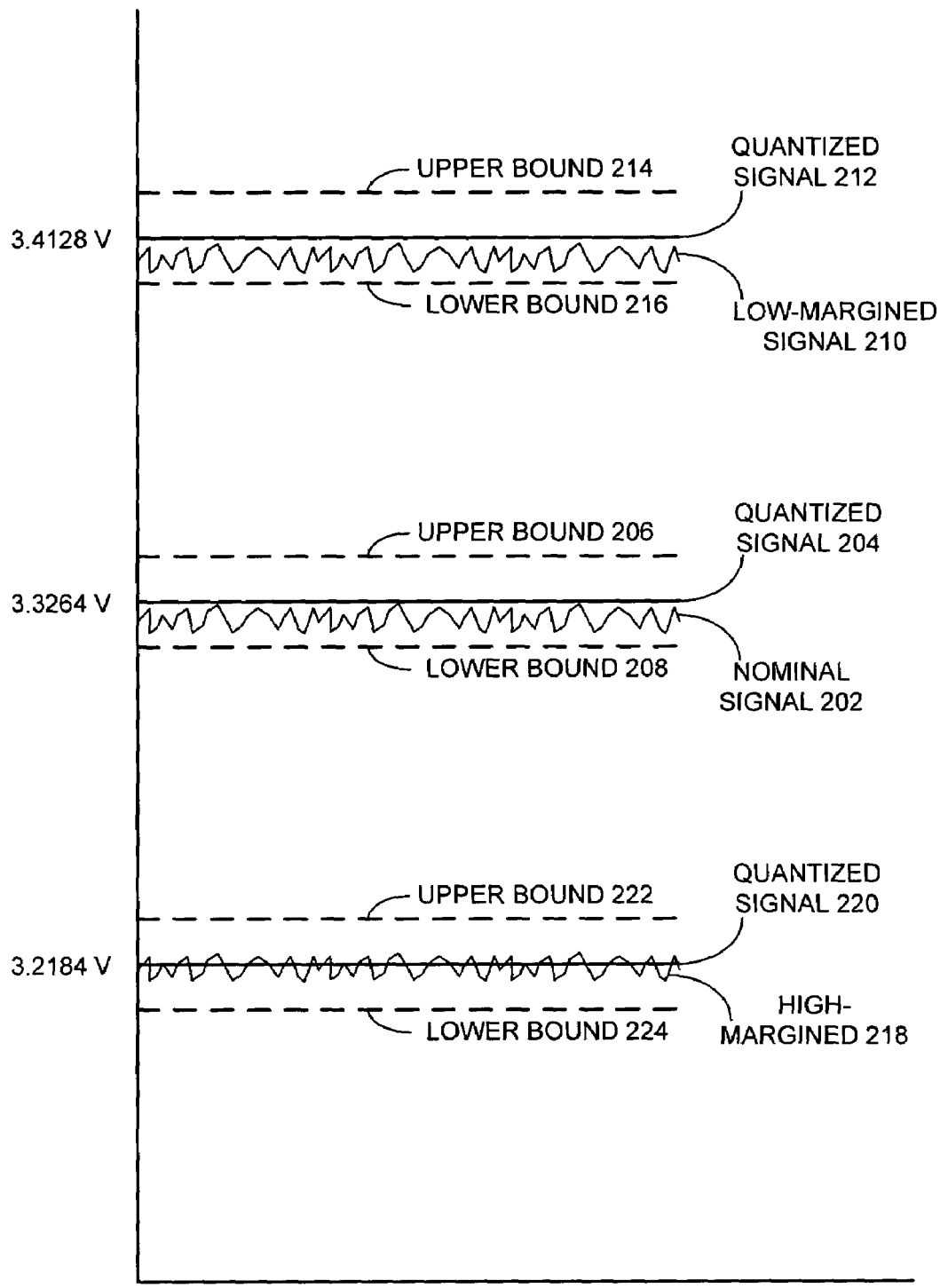
FIG. 2 illustrates a quantized nominal signal, a quantized high-margined signal, and a quantized low-margined signal in accordance with an embodiment of the present invention.

FIG. 2 illustrates a quantized nominal signal, a quantized high-margined signal, and a quantized low-margined signal in accordance with an embodiment of the present invention. It contains nominal signal 202, quantized signals 204, 212, and 220, upper bounds 206, 214, and 222, lower bounds 208, 216, and 224, low-margined signal 210, and high-margined signal 218. $Q[x_{NO}]$ corresponds to quantized signal 204. $Q[x_{LO}]$ corresponds to quantized signal 212. $Q[x_{HI}]$ corresponds to quantized signal 220. Note that the quantized signals are in the middle of the uncertainty intervals bounded by the upper and lower bounds.

The nominal signal value and margined signal value are related as:

$$x_{HI}=(1+m/100)^* x_{NO} \text{ and } x_{LO}=(1-m/100)^* x_{NO}$$

where m is the margin percentage (for example, 3%). Using this relationship, the inequality for the nominal signal value can be tightened as:

$$\max\{Q[x_{NO}]-\Delta, (Q[x_{HI}]-\Delta)/(1+m/100), (Q[x_{LO}]-\Delta)/(1-m/100)\}$$

$$< x_{NO}$$

$$< \min\{Q[x_{NO}]+\Delta, (Q[x_{HI}]+\Delta)/(1+m/100), (Q[x_{LO}]+\Delta)/(1-m/100)\}$$

The tighter bounds produce lower uncertainty levels in the actual signal at nominal value.

Figure 3:
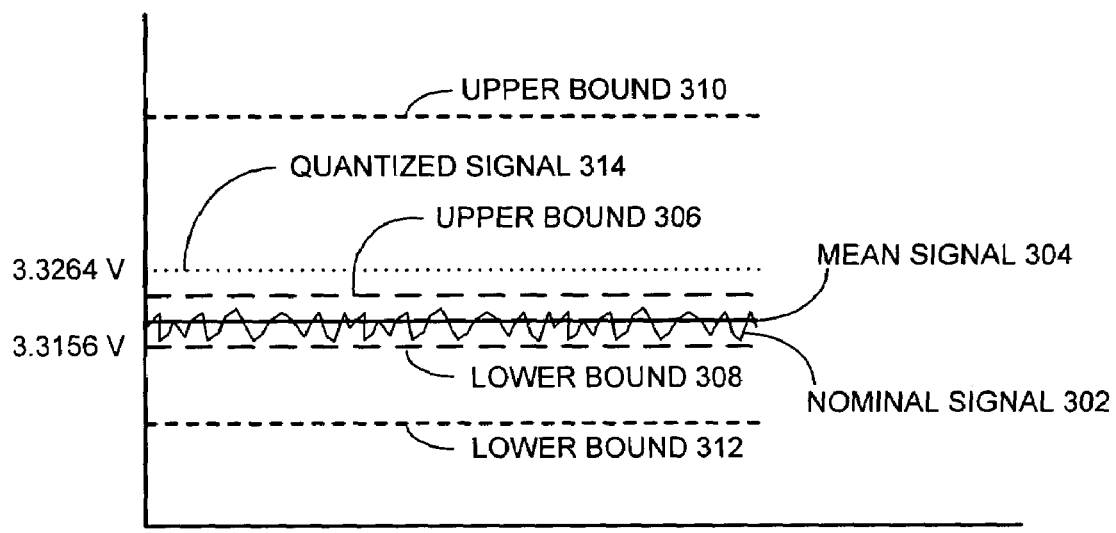
FIG. 3 illustrates a reduced uncertainty interval for a quantized signal in accordance with an embodiment of the present invention.

FIG. 3 illustrates a reduced uncertainty interval for a quantized signal in accordance with an embodiment of the present invention. It contains nominal signal 302, mean signal 304, upper bounds 306 and 310, lower bounds 308 and 312, and quantized signal 314. Note that the actual signal is within the adjusted uncertainty interval, which is bounded by upper bound 306 and lower bound 308. Mean signal 304, which is the adjusted mean of the quantized signal and which is in the middle of the adjusted uncertainty interval, is close to the true mean of the signal. On the other hand, quantized signal 314, which is in the middle of the original uncertainty interval bounded by upper bound 310 and lower bound 312, is not close to the true mean of the signal.

Therefore, by exploiting additional information about the severely quantized signal, the uncertainty in estimating the true mean of the signal is significantly reduced.

Note that a significant improvement in mean and uncertainty interval is not guaranteed for all situations. For example, when the relative change between $Q[x_{NO}]$ and $Q[x_{HI}]$ is exactly or very close to the margin percentage, or when $(m/100^*x_{NO})=k^*\Delta$ where k is an integer, there will only be a slight improvement in the uncertainty interval. For such situations, which make up a small percentage of the signals being monitored via telemetry at any given time, there is little or no improvement over the conventional threshold-limit monitoring approach, which is used concurrently with the present invention and therefore these signals are no worse off. For the majority of signals being monitored, there is a significant reduction in uncertainty and an increase in sensitivity for early detection of the onset of hardware degradation.

Reducing Uncertainty

Figure 4:
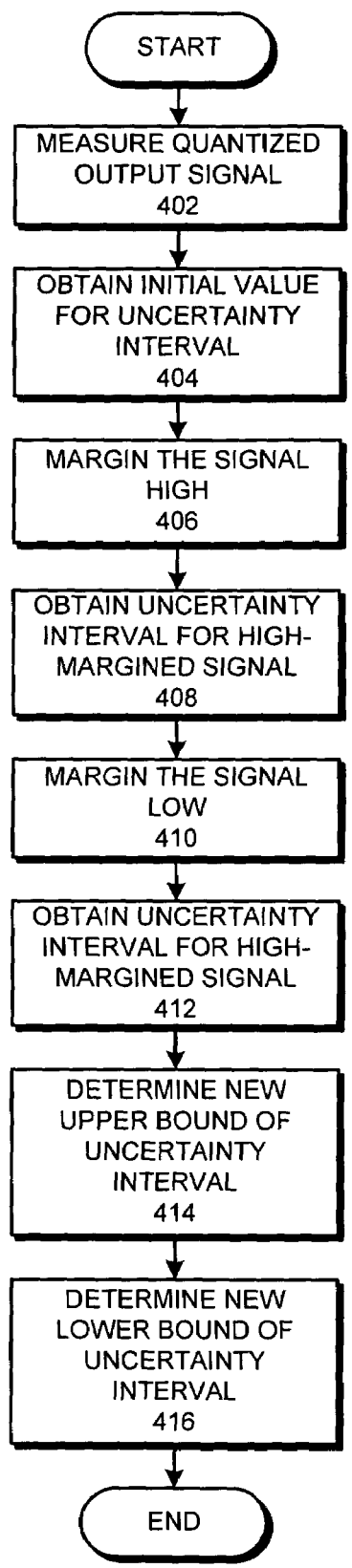
FIG. 4 presents a flow chart illustrating the process of reducing the uncertainty interval of a quantized signal in accordance with an embodiment of the present invention.

FIG. 4 presents a flow chart illustrating the process of reducing the uncertainty interval of a quantized signal in accordance with an embodiment of the present invention. The process begins when the system measures a quantized output signal from a sensor (step 402). Next, the system obtains an initial value for an uncertainty interval for the quantized output signal (step 404). Note that the initial uncertainty interval is simply the quantization interval of the quantized output signal. The system then margins the quantized output signal high by introducing a controlled increase in the mean of the quantized output signal to produce a high-margined quantized output signal (step 406). The system then obtains the uncertainty interval for the high-margined quantized output signal by measuring the high-margined quantized output signal from the sensor (step 408).

Next, the system margins the quantized output signal low by introducing a controlled decrease in the mean of the quantized output signal to produce a low-margined quantized output signal (step 410). The system then obtains the uncertainty interval for the low-margined quantized output signal by measuring the low-margined quantized output signal from the sensor (step 412).

Note that the system can increase or decrease an input signal by a fixed amount to produce the controlled increase or the controlled decrease in the mean of the quantized output signal, respectively. (Also note that in some circuits, increasing the input signal decreases the mean of the output signal, and similarly, decreasing the input signal increases the mean of the output signal.)

Furthermore note that the input signals can include voltage, current, temperature, clock speed, and/or load, and the quantized output signals can include voltage, temperature, and/or current.

Next, the system determines the upper bound of the uncertainty interval by selecting the minimum upper bound from: the uncertainty interval for the quantized output signal, the uncertainty interval for the high-margined quantized output signal, and the uncertainty interval for the low-margined quantized output signal (step 414). The system then determines the lower bound of the uncertainty interval by selecting the maximum lower bound from: the uncertainty interval for the quantized output signal, the uncertainty interval for the high-margined quantized output signal, and the uncertainty interval for the low-margined quantized output signal (step 416).

The benefits of the present invention include:
1. Reducing the uncertainty of severely quantized telemetry signals on components of high-end and midrange computer servers.
2. Using the reduced-uncertainty signals to provide earlier identification of indicative signatures such as drift in the mean and the variance, and to allow the usage of proactive diagnostics and system failure avoidance.
3. Requiring very small disturbance of the components via margining the signals.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing uncertainty in a quantized signal, comprising:
    measuring a quantized output signal from a sensor;
    obtaining an initial value for an uncertainty interval for the quantized output signal;
    margining the quantized output signal high by introducing a controlled increase in the mean of the quantized output signal to produce a high-margined quantized output signal;
    measuring the high-margined quantized output signal from the sensor;
    using information about the bounds of the high-margined quantized output signal to reduce the uncertainty interval;
    using the quantized output signal and information about the reduced uncertainty level for the quantized output signal to determine whether a component monitored by the sensor is at the onset of degradation; and
    if so, performing a remedial action.

2. The method of claim 1, wherein the method further comprises:
    margining the quantized output signal low by introducing a controlled decrease in the mean of the quantized output signal to produce a low-margined quantized output signal;
    measuring the low-margined quantized output signal from the sensor;
    using information about the bounds of the low-margined quantized output signal to further reduce the uncertainty interval.

3. The method of claim 2, wherein reducing the uncertainty interval for the quantized output signal involves:
    obtaining the uncertainty intervals for the high-margined and the low-margined quantized output signals;
    determining an upper bound for the uncertainty interval by selecting the minimum upper bound from: the uncertainty interval for the quantized output signal, the uncertainty interval for the high-margined quantized output signal, and the uncertainty interval for the low-margined quantized output signal; and
    determining a lower bound for the uncertainty interval by selecting the maximum lower bound from: the uncertainty interval for the quantized output signal, the uncertainty interval for the high-margined quantized output signal, and the uncertainty interval for the low-margined quantized output signal.

4. The method of claim 2, wherein margining the quantized output signal high involves increasing an input signal by a fixed amount.

5. The method of claim 2, wherein margining the quantized output signal low involves decreasing an input signal by a fixed amount.

6. The method of claim 1,
    wherein an input signal can include a voltage, current, temperature, clock speed, and/or load; and
    wherein the quantized output signals can include voltage, temperature, and/or current.

7. The method of claim 1, wherein the initial value for the uncertainty interval is the quantization interval of the quantized output signal.

8. An apparatus for reducing uncertainty in a quantized signal, comprising:
    a computer system;
    a margining mechanism configured to:
        measure a quantized output signal from a sensor within the computer system;
        obtain an initial value for an uncertainty interval for the quantized output signal;
        margin the quantized output signal high by introducing a controlled increase in the mean of the quantized output signal to produce a high-margined quantized output signal;
        measure the high-margined quantized output signal from the sensor;
        use information about the bounds of the high-margined quantized output signal to reduce the uncertainty interval; and
    a diagnostic mechanism configured to:
        use the quantized output signal and information about the reduced uncertainty level for the quantized output signal to determine whether a component monitored by the sensor is at the onset of degradation; and
        if so, to perform a remedial action.

9. The apparatus of claim 8, wherein the margining mechanism is additionally configured to:
  margin the quantized output signal low by introducing a controlled decrease in the mean of the quantized output signal to produce a low-margined quantized output signal;
  measure the low-margined quantized output signal from the sensor; and to
  use information about the bounds of the low-margined quantized output signal to further reduce the uncertainty interval.

10. The apparatus of claim 9, wherein while reducing the uncertainty interval for the quantized output signal, the margining mechanism is configured to:
  obtain the uncertainty intervals for the high-margined and the low-margined quantized output signals;
  determine an upper bound for the uncertainty interval by selecting the minimum upper bound from: the uncertainty interval for the quantized output signal, the uncertainty interval for the high-margined quantized output signal, and the uncertainty interval for the low-margined quantized output signal; and to
  determine a lower bound for the uncertainty interval by selecting the maximum lower bound from: the uncertainty interval for the quantized output signal, the uncertainty interval for the high-margined quantized output signal, and the uncertainty interval for the low-margined quantized output signal.

11. The apparatus of claim 9, wherein while margining the quantized output signal high, the margining mechanism is configured to increase an input signal by a fixed amount.

12. The apparatus of claim 9, wherein while margining the quantized output signal low, the margining mechanism is configured to decrease the input signal by a fixed amount.

13. The apparatus of claim 8,
  wherein an input signal can include a voltage, current, temperature, clock speed, and/or load; and
  wherein the quantized output signals can include voltage, temperature, and/or current.

14. The apparatus of claim 8, wherein the initial value for the uncertainty interval is the quantization interval of the quantized output signal.

15. A computer system for reducing uncertainty in a quantized signal, comprising:
  a computer system; and
  a margining mechanism configured to:
    measure a quantized output signal from a sensor within the computer system;
    obtain an initial value for an uncertainty interval for the quantized output signal;
    margin the quantized output signal high by introducing a controlled increase in the mean of the quantized output signal to produce a high-margined quantized output signal;
    measure the high-margined quantized output signal from the sensor;
    use information about the bounds of the high-margined quantized output signal to reduce the uncertainty interval; and
  a diagnostic mechanism configured to:
    use the quantized output signal and information about the reduced uncertainty level for the quantized output signal to determine whether a component monitored by the sensor is at the onset of degradation; and
    if so, to perform a remedial action.

16. The computer system of claim 15, wherein the margining mechanism is configured to:
  margin the quantized output signal low by introducing a controlled decrease in the mean of the quantized output signal to produce a low-margined quantized output signal;
  measure the low-margined quantized output signal from the sensor; and to
  use information about the bounds of the low-margined quantized output signal to further reduce the uncertainty interval.

17. The computer system of claim 16, wherein while reducing the uncertainty interval for the quantized output signal, the margining mechanism is configured to:
  obtain the uncertainty intervals for the high-margined and the low-margined quantized output signals;
  determine an upper bound for the uncertainty interval by selecting the minimum upper bound from: the uncertainty interval for the quantized output signal, the uncertainty interval for the high-margined quantized output signal, and the uncertainty interval for the low-margined quantized output signal; and to
  determine a lower bound for the uncertainty interval by selecting the maximum lower bound from: the uncertainty interval for the quantized output signal, the uncertainty interval for the high-margined quantized output signal, and the uncertainty interval for the low-margined quantized output signal.

18. The computer system of claim 16, wherein while margining the quantized output signal high, the margining mechanism is configured to increase an input signal by a fixed amount.

19. The computer system of claim 16, wherein while margining the quantized output signal low, the margining mechanism is configured to decrease an input signal by a fixed amount.

20. The computer system of claim 15, wherein the initial value for the uncertainty interval is the quantization interval of the quantized output signal.

* * * * *